United States Patent [19]
Deutz

[11] 4,291,673
[45] Sep. 29, 1981

[54] PASSIVE SOLAR ROOF ICE MELTER

[76] Inventor: Roger T. Deutz, 4844 Vincent Ave., South, Minneapolis, Minn. 55410

[21] Appl. No.: 65,127

[22] Filed: Aug. 9, 1979

[51] Int. Cl.³ .............................................. F24J 3/02
[52] U.S. Cl. .................................... 126/417; 126/438; 126/450; 165/47
[58] Field of Search .................. 165/47; 126/417, 438, 126/441, 439, 449, 451, 450; 52/94

[56] References Cited

U.S. PATENT DOCUMENTS

| | | | |
|---|---|---|---|
| 2,111,251 | 3/1938 | Spilsbury | 165/47 |
| 2,780,415 | 2/1957 | Gay | 126/436 |
| 2,998,006 | 8/1961 | Johnston | 126/449 |
| 3,001,331 | 9/1961 | Brunton | 126/438 |
| 3,039,453 | 6/1962 | Andrassy | 126/447 |
| 3,207,211 | 9/1965 | Winterfeldt | 126/449 |
| 3,244,186 | 4/1966 | Thomason et al. | 126/426 |
| 3,366,168 | 1/1968 | Dale | 126/417 |
| 3,388,738 | 6/1968 | Dery | 165/47 |
| 3,923,039 | 12/1975 | Falbel | 126/424 |
| 4,011,855 | 3/1977 | Eshelman | 126/441 |
| 4,020,605 | 5/1977 | Zenos | 126/417 |
| 4,091,798 | 5/1978 | Fletcher et al. | 126/438 |
| 4,122,832 | 10/1978 | Hirschsohn | 126/450 |
| 4,122,833 | 10/1978 | Lovelace et al. | 126/438 |
| 4,127,104 | 11/1978 | Greene | 126/450 |
| 4,132,219 | 1/1979 | Cohen et al. | 126/438 |
| 4,132,221 | 1/1979 | Orillion | 126/441 |
| 4,132,222 | 1/1979 | Roark | 126/450 |
| 4,137,901 | 2/1979 | Maier | 126/438 |
| 4,173,214 | 11/1979 | Fattor | 126/441 |
| 4,224,923 | 9/1980 | Wells | 126/417 |

Primary Examiner—Daniel J. O'Connor
Attorney, Agent, or Firm—Kinney, Lange, Braddock, Westman & Fairbairn

[57] ABSTRACT

An elongated passive solar roof ice melter is placed on top of accumulated ice and snow including an ice dam along the lower edge of a roof of a heated building and is held against longitudinal movement with respect to itself. The melter includes a bottom wall having an upper surface highly absorbent to radiant solar energy; a first window situated at right angles with respect to the bottom wall, and a reflecting wall connecting the opposite side edges of the bottom wall and the first window. The reflecting wall has a surface facing the bottom wall and the window which is highly reflective to radiant solar energy. Radiant solar energy passes through the first window and either strikes the highly absorbent upper surface of the bottom wall or first strikes the reflecting wall to be reflected down to the upper surface of the bottom wall. The heat generated thereby melts through the ice below the bottom wall causing the ice dam to be removed between the bottom wall and the top of the roof and immediately adjacent to the ice melter along the roof. Water dammed up by the ice dam can then flow down through this break in the dam and drain out harmlessly onto the ground. This prevents dammed water from seeping back under the shingles and into the house to damage the interior of the house.

6 Claims, 6 Drawing Figures

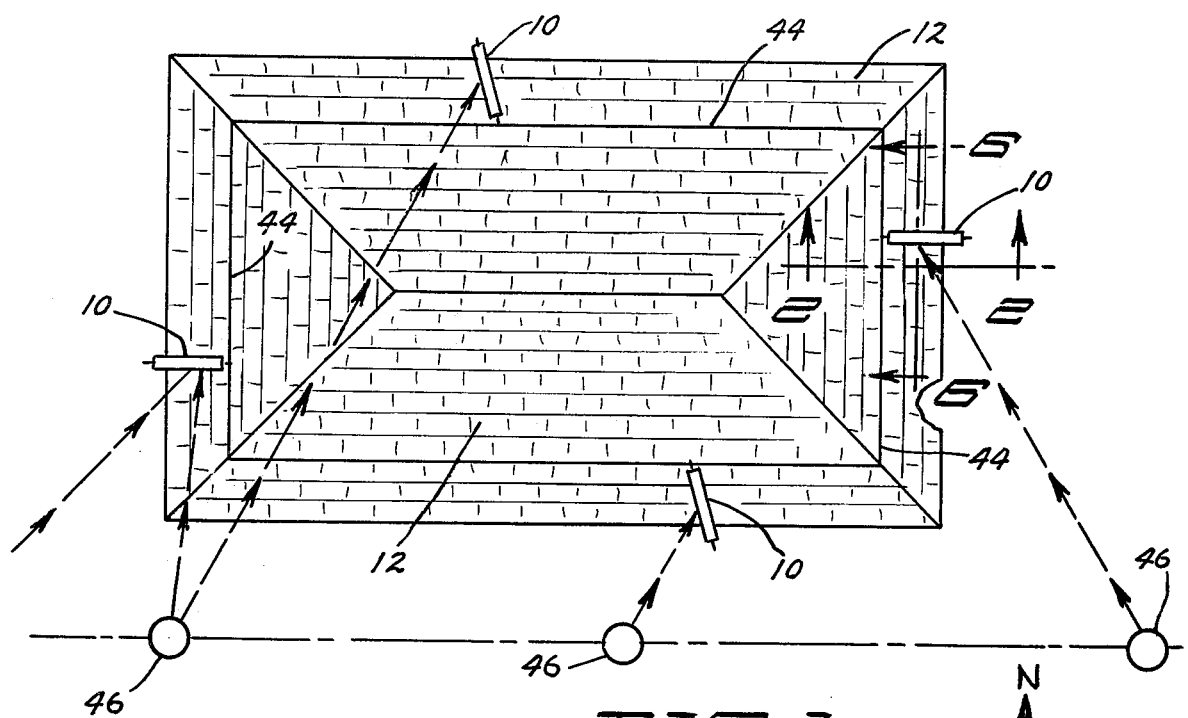
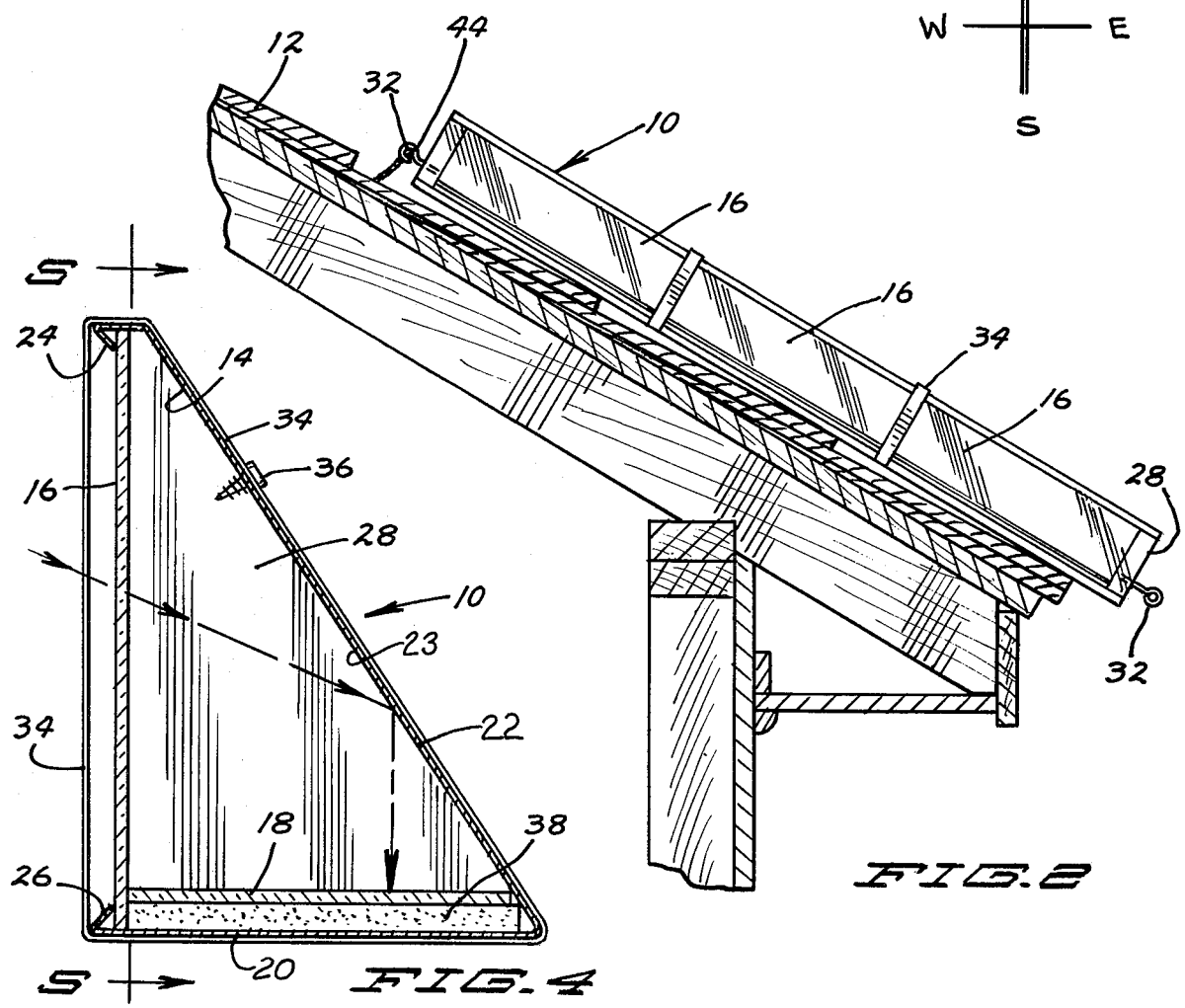

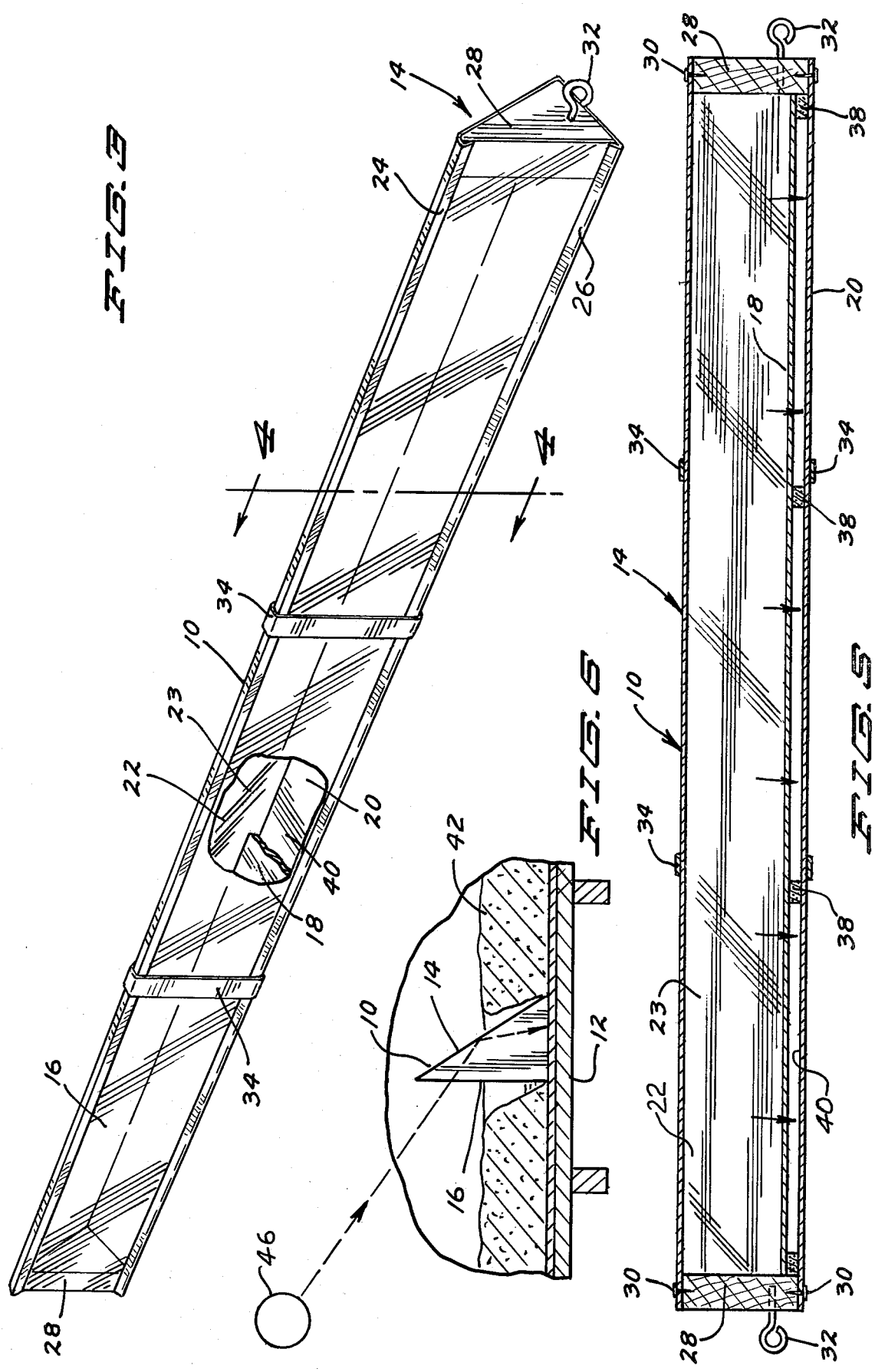

PASSIVE SOLAR ROOF ICE MELTER

BACKGROUND OF THE INVENTION

In northern climes, snow will build up to substantial depths on the roofs of houses in the winter time. Many such roofs are covered with shingles so that the roof is waterproof only when water runs down from the top of the roof toward the eave. Where water builds up in contact with the roof and cannot run off, it seeps up underneath the shingles, and then passes through the roof boards which are not watertight, and passes inside of the house to run down through ceilings and walls to cause extensive damage. The same situation persists where roll roofing is used, the lower edge of each longitudinally extending strip overlying the top edge of the next lower strip of roofing, so that water trapped on the roof can run back up underneath the lower edge of each of the strips having water trapped above it.

In the usual situation, during a less than severe winter, snow will melt and run down over the edge of the roof, and will run off through the gutters, or will freeze to form ice in the gutters, with the melting snowwater running over the edge of the ice and over the gutter and harmlessly off onto the ground.

In severe winters, when the weather is well below freezing on the outside, heat losses from the house, coming up through the roof will tend to cause the snow to melt on the underside and to run down the shingles in the usual manner. When reaching the gutter, the heat from the house is no longer present, and ice will form a dam all along the edges of the roof. This ice dam, whether over a gutter or whether on a roof with no gutter, gradually expands in size as more and more water runs down the roof and tries to get over the top of the dam and onto the ground. As this water gets farther away from the heat leakage source coming up through the house, it drops below freezing and the size of the dam is increased.

It is evident that this "ice dam" action can take place, and often does take place, all the way around the edge of the roof, so that a body of water, under the snow, can exist along the edge of the roof, held in place by the ice dam. This water is free to seep up underneath the shingles and to run down inside of the house. Once inside of the house, it can run along floor joists, around wall plates and down studs, and can seep into ceilings and walls to deface them with water marks if not to actually destroy them by causing them to become loaded with water and to literally fall apart.

During the winter of 1978–1979, it was estimated that over one-third of the houses in the Minneapolis-St. Paul seven county metropolitan area suffered from damage due to the above described ice dam action.

Because of similar damage in previous years, many homeowners have resorted to putting specially made elongated electrical heating elements or cables in their gutters and/or along bottom edges of the roofs where they will be exposed to the snow, and where they can be turned on to remove or prevent any ice dam build-up. This is expensive both in terms of the buying of the heating element originally and in terms of having to supply electrical power to the heating element over large time intervals to prevent ice dam build up. Furthermore, where such elements are not installed before the winter storms, it is not a satisfactory method of removing ice dams once the snow and ice build-up has occurred or once the snow has built up and the ice dam is starting to form.

A common expedient, where physically possible, is to use long handled T-shaped scrapers to scrape the snow above the ice dam down off of the roof and onto the ground (and onto the body of the person holding onto the handle of the scraper, in many cases) in order to let the heat of the sun join with the heat coming up from the house to melt off the ice thus removing the source of the problem of reverse flow of water up through the shingles. This solution is particularly damaging to the roof surface itself, as it presupposes dragging the scraper over the surface of the roof to get the snow down. It is common knowledge that such scraping over a roof surface will tend to knock off the particles on the surface of the shingles thus causing the shingle roof to wear out long before its appointed time. Furthermore, there is a certain amount of physical ability and danger involved in standing on a ladder at the bottom of a slanted roof to manipulate the scraper to cause the snow to come down.

Owners of heavy equipment of the "cherry picker" type have made their equipment and their operators available to clear off roofs. If the operator is careful not to actually touch the roof with his power equipment as he reaches up over the roof and then causes the snow to be carried down from it, this can be effective until such time as the snow falls again. Prices for this kind of work in certain areas of Minneapolis, during the 1978–1979 winter season ranged from $50 to $100 per house, however. Where the conditions for the build-up and formation of ice dams are right, this means virtually $50 to $100 per snow-storm. Obviously this is not a satisfactory alternative except in very extreme cases.

Homeowners have been known to reach out of bedroom windows and gable windows to attack the ice dams with ice choppers and axes and shovels and the like. Cutting a slot through the ice dam is a satisfactory solution as it allows the melted water to all run to the break in the dam and run out over the edge of the roof, and the resulting rather rapid flow of water is often fast enough to drain away the water seeping up under the shingles at least until such time as an ice dam forms again where the break was made. Those in privity with the present applicant can assert, however, that it is all too easy to do accidental damage to the roof, the roofing, and the gutters while using this "main force" approach.

A search was made on this invention in the U.S. Patent and Trademark Office, and two patents somewhat directly related to the problem were located. These are U.S. Pat. No. 3,207,211 granted to Winterfeldt in September of 1965 and U.S. Pat. No. 2,111,251 granted on Spilsbury in March of 1938.

The Winterfeldt patent shows simply the use of relatively small tabs of metal having high heat absorbing and conducting characteristics physically attached below the eaves trough or gutter at intervals. These tabs absorb the heat from the sun or the sky, and tend to keep the water from freezing in the eave trough or gutter. The tabs are fastened to the troughs with hollow rivets so that when ice is melted and water forms in the trough above the tab, the melted water can drip out through the rivet to the ground, thus encouraging the snow and ice in adjacent areas to melt as soon as sufficient heat is transmitted through the gutter from the tab to cause that to happen.

The Spilsbury patent discloses the use of an elongated heating element permanently attached to the eaves or to the gutter to melt or prevent formation of ice in immediate adjacent relationship to metallic flashing along the eaves or the metallic structure of the gutter.

The other patents located in the search which are specifically related to the solar heating of structures were:

U.S. Pat. No. 2,780,415 granted in February of 1957 to Gay;

U.S. Pat. No. 2,998,006 granted in August of 1961 to Johnston; and

U.S. Pat. No. 3,039,453 granted in June of 1962 to Andrassy.

Gay discloses a heat pump operated system for house heating; Johnston discloses a solar fluid heater related to heating of houses and other enclosures; and Andrassy discloses a heat exchanger unit using solar energy to operate a water heater. None of these patents addresses the problem of elimination or prevention of ice dam build-up. In fact, the conventional roof portions of the structures shown in the Gay and Johnston patents would be subject to ice dam build-up growing out of heat losses straight up through the roof of structures.

U.S. Pat. No. 4,020,605 granted in May of 1977 to Zenos shows the use of panels which can be reversed to absorb heat from the sun in the winter and to reflect heat from the sun in the summer. The invention relates most particularly to flat roof surfaces, and no way in which that structure can be applicable to the present problem is shown or suggested therein.

U.S. Pat. No. 3,001,331 granted in September of 1961 to Brunton shows a roof shingle structure which has surfaces which will be effective to reflect away the high rays of the summer sun and to absorb heat from the low rays of the winter sun. The invention has no relation to the prevention of ice dam build-up even on roofs covered with such shingles and faced with the ice dam build-up conditions as described above.

The remaining patents located in the search made of the prior art are:

U.S. Pat. No. 3,244,186 granted in April of 1966 to Thomason et al;

U.S. Pat. No. 4,137,901 granted in February of 1979 to Maier et al

U.S. Pat. No. 4,091,798 granted in May of 1978 to Fletcher et al; and

U.S. Pat. No. 4,122,833 granted in October of 1978 to Lovelace.

All of this last group of patents relate to solar collectors, but none teaches or discloses or even suggests the concept of using such collectors to alleviate or eliminate the problem of ice dam build-up on roofs.

The Thomason et al patent shows the use of transparent or translucent sides of a tent to allow passage of solar rays into the tent to impinge on opaque tent sides thus to heat the tent. It is contemplated that the tent will be turned around in the other direction so that, when the tent is not to be heated, the sun's rays fall on the opaque side of the tent outside of the tent and tend to be reflected.

The Maier et al patent shows the use of a transparent window or pane for allowing solar energy to pass therethrough to reflect on the bottom of a pan of water to bounce up to a reflective sheet and then to reflect back into the water pan. The idea is that the solar energy will be picked up in the water or other liquid as it passes through. Obviously such a structure would not be effective or efficient on a sloping roof where the water in the pan could not lie in a horizontal plane throughout the pan.

The patents to Fletcher et al and Lovelace disclose solar collectors which include right angle triangular pieces of reflective opaque metal which tend to concentrate the sun's rays down on cylindrical tubular receivers where circulating heat transfer liquids carry the released heat to locations for use. These systems are, of course, not passive and require the expenditure of energy to circulate the heat transfer through a medium, for example.

The applicant and those in privity with him know of no closer prior art than that set out above; and they know of no prior art which anticipates the claims made in this application.

In order to provide an effective way to combat ice dam build-up both before it occurs and after it occurs, the structure of the present invention was developed.

BRIEF SUMMARY OF THE INVENTION

An elongated passive solar roof ice melter includes an elongated flat bottom wall of thermally conductive material having an upper surface which is highly absorbent of radiant heat energy, a flat reflecting wall coextensive of the length of the bottom wall and extending upwardly from a rear edge of the bottom wall at an acute angle with respect to it, and a first window or plate coextensive with the length of the bottom and the reflective walls and extending from an edge of the bottom wall opposite the reflecting wall to the top edge of the reflecting wall, said plate being translucent to passage of radiant heat energy therethrough.

In the form of the invention shown, end walls close each of the triangles formed by end edges of the bottom and the reflecting walls and the window or plate.

A second window or plate translucent to passage of radiant heat energy is situated inside of the melter in spaced, adjacent, parallel relationship to the bottom wall to provide a heatable air space between the bottom wall and the rest of the interior of the melter.

Means is provided to position the melter to lie up the face of a sloping enclosure roof, to overlie the bottom edge of the roof, and to permit solar or other radiant heat energy available in the atmosphere to pass through the first translucent window.

IN THE DRAWINGS

FIG. 1 is a top plan view of a building roof with a number of passive solar roof ice melters of the present invention deployed thereon;

FIG. 2 is a view taken on the line 2—2 in FIG. 1 showing an ice melter of the present invention in front plan in relationship to a portion of a house roof in vertical section;

FIG. 3 is a perspective view of an ice melter of the present invention;

FIG. 4 is a vertical sectional view taken on the line 4—4 in FIG. 3;

FIG. 5 is a vertical sectional view taken approximately on the line 5—5 in FIG. 4; and FIG. 6 is a vertical sectional view taken on the line 6—6 in FIG. 1 and showing the path made by the ice melter through roof ice and snow as it melts its way down to the roof top.

DESCRIPTION OF PREFERRED EMBODIMENT

In the form of the invention as shown, a plurality of passive solar roof ice melters 10 are all shown to have identical construction. However, this construction can vary considerably within the spirit of the invention and the scope of the claims which follow, and the construction shown is for the purpose of illustration and not limitation.

As seen in FIG. 1, these ice melters 10 can each be positioned on top of a house roof 12 in such a location as to receive sunlight on their front faces. They can be so positioned before the winter storms or on top of the ice and snow to melt ice and snow under them and immediately adjacent to them.

Each ice melter 10 includes a forwardly open angular frame 14, a substantially first upright window or plate 16 capable of passing solar radiant energy therethrough and positioned to close the forward opening in the frame 14, a second window or plate 18 capable of passing solar energy therethrough and positioned at right angles to the first window or plate in adjacent but spaced relationship to a bottom wall or floor 20 of the frame 14.

In addition to bottom wall 20, frame 14 includes a reflecting wall 22 extending upwardly at an acute angle from wall 20, an upper first window retaining flange 24 and a lower first window retaining flange 26. The forward surface of wall 22 is constituted as a highly reflective reflecting surface 23. The triangular open ends of each ice melter 10 are closed by end walls 28,28, shown in this form of the invention as being constituted as triangular blocks of wood fastened to the frame 14 by nails or screws 30 and/or by adhesive or other appropriate means. Hook eyes 32,32 are provided in the wooden end walls 28,28, for the purpose of positioning the ice melters with respect to the edges of a roof such as roof 12 in a manner to be described. Retaining bands 34,34 wrap around the entire ice melter structure to position the parts permanently with respect to each other. As shown, these bands are fastened through the reflecting wall 22 by sheet metal screws 36.

The second window or plate 18 is mounted in parallel, spaced relationship with respect to the bottom wall 20 of the frame 14 by being adhered to black sponge rubber spacers 38 which are themselves adhered at spaced intervals to the top surface of bottom wall or floor 20 of the frame 14.

In the form of the invention shown, the frame 14 will be made of a single aluminum sheet and the forwardly facing inner surface of reflecting wall 22 of that aluminum sheet will be of a nature which will tend to reflect radiant solar energy or any other radiant energy impinging upon it down toward and through second window or plate 18 and on to the upper surface of bottom wall 20 of the frame 14. All inside and outside surfaces of this aluminum frame 14 except the forwardly facing surface of the reflecting wall can be painted black or otherwise treated to absorb heat energy including radiant solar energy impinging upon it. Ideally the first and second windows or plates will be as transparent as possible to solar radiant energy and any other heat energy impinging on the ice melter.

Specifically, an upper surface 40 of the bottom wall or floor 20 of the frame 14 will be painted black or otherwise constituted to have heat absorbent coloration and/or finish. Then when working under optimum conditions, radiant solar energy will pass through the first window or plate 16, strike the reflecting surface 23 of the reflecting wall 22, and reflect through the second window or plate 18 to the upper heat absorbent surface 40 of the bottom wall or floor 20 of the frame. This radiant energy will then be absorbed and will be transmitted through the aluminum wall 20 to melt the ice and snow underneath it.

As this ice and snow melts, as best seen in FIG. 6, it has been found by actual usage that more heat is generated toward the rear of the device. Therefore, the device moves transversely in rearward direction as it moves down through the snow and ice. This has the favorable effect of moving the first upright window or plate 16 away from the snow in front of it so that the sun can still pass through that plate to be reflected down to the bottom of the ice melter. This effect is illustrated somewhat schematically in FIG. 6, where the composite snow and ice are shown at 42 on the house roof 12.

Referring again to FIG. 1, the house roof 12 is shown as extending longitudinally in westerly/easterly direction. A cable 44 or other appropriate line is shown positioned perhaps three or four feet from the outer edge of the roof 12 and is for the purpose of being received by the hook eyes 32 of the ice melters 10. For the purpose of illustration, only one ice melter is shown along each of the four walls of the roof 12; but such ice melters may be needed every three or four feet along trouble spots of the roof of the house. Alternatively, a limited number of ice melters could be moved periodically by the homeowner to hook into different positions along the cable 44 to provide channels for escaping water and to reduce the ice build-up.

Light snowfall will not affect the performance of the ice melters as the sun will melt the snow in front of the first window or plate to again permit access of its own radiant energy to the reflecting wall 22. However, after a heavy snowfall of approximately five inches or more, it may be necessary to brush the snow away from the surface of the first window 16 to insure that the ice melter will immediately be fully effective in its operation.

As soon as a channel is provided by the ice melter through the snow and ice down to the surface of the roof top, water forming under the snow due to heat losses from the house up through the roof will run down this channel and off of the roof. It will not have a chance to flow back up under the shingles and through the roof boards to damage the interior of the house.

When a snow storm comes with the ice melters positioned flat on and in contact with the roof, as soon as the sun appears, it will warm the ice melters and the roof adjacent thereto. This will prevent an ice build-up at the edge of the roof immediately adjacent the melter and so any water forming under nearby ice and snow can flow out and off of the roof adjacent to the roof melter.

The embodiments of the invention in which an exclusive property or privilege is claimed are defined as follows:

1. A passive solar roof ice melter for use on a sloping enclosure roof, said melter including:
   A. an elongated frame including:
      i. An elongated flat bottom wall partially bounded by parallel, spaced apart front and rear edges, and
      ii. a flat reflecting wall made of material which reflects solar energy, said flat reflecting wall being coextensive with the length of the bottom wall and extending upwardly from the entire rear edge of the bottom wall at an acute angle with respect to said bottom wall;

B. a first plate translucent to passage of solar energy and other radiant heat transferring energy, said plate being coextensive with the length of the frame walls and extending from the entire front edge of the bottom wall to the entire top edge of the reflecting wall, said first plate being in perpendicular relationship to said bottom wall;

C. means to close the ends of the triangles formed by end edges of said bottom and reflecting frame walls and said plate; and D. means to position said melter to rest above the sloping enclosure roof with a first end edge portion of said flat and reflecting frame walls and said first plate adjacent to and overlying a bottom edge of said roof, and with a second end edge portion of those walls and that plate lying generally up the roof from the edge thereof.

2. The passive solar roof ice melter of claim 1 wherein:

E. the surface of said reflecting wall facing said first plate and said bottom wall is constituted as being highly reflective to radiant heat energy; and F. the upper surface of said bottom wall is constituted as being highly absorbent of solar and other radiant heat transferring energy.

3. The passive solar roof ice melter of claim 2 wherein:

G. a flat second plate translucent to passage of solar and other radiant heat transferring energy is situated in parallel relatively closely spaced relation to said bottom wall to define with said bottom wall, a bottom edge portion of said reflecting wall and of said first plate and said end closing means a heatable air compartment.

4. The passive solar roof ice melter of claim 3 wherein:

H. the surface of said reflecting wall opposite said reflecting surface is constituted as being highly absorbent to solar and other radiant heat transferring energy.

5. The passive solar roof ice melter of claim 4 wherein:

I. the bottom surface of said bottom wall is constituted as being highly absorbent to solar and other radiant heat transferring energy.

6. The passive solar roof ice melter of claim 4 wherein:

J. said means to close the triangle formed by the ends of the bottom and reflecting walls and the first plate includes triangular end walls in contiguous relation to the end edges of each of said bottom and reflecting walls and said first plate; and K. means is provided to position said melter to extend up the roof and to overlie a bottom edge of said roof, said means including a cable fastened with respect to said roof and a hook means in at least one of said end walls adapted to be fixedly positioned with respect to said cable.

* * * * *